(12) United States Patent
Aramaki et al.

(10) Patent No.: US 11,233,917 B2
(45) Date of Patent: Jan. 25, 2022

(54) LIGHTING DEVICE AND IMAGE READING DEVICE

(71) Applicant: Mitsubishi Electric Corporation, Tokyo (JP)

(72) Inventors: Toru Aramaki, Tokyo (JP); Hideki Matsui, Tokyo (JP); Hiroshi Koike, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/051,438

(22) PCT Filed: Jun. 25, 2019

(86) PCT No.: PCT/JP2019/025087
§ 371 (c)(1),
(2) Date: Oct. 29, 2020

(87) PCT Pub. No.: WO2020/008944
PCT Pub. Date: Jan. 9, 2020

(65) Prior Publication Data
US 2021/0243326 A1 Aug. 5, 2021

(30) Foreign Application Priority Data
Jul. 5, 2018 (JP) ............................. JP2018-127949

(51) Int. Cl.
*H04N 1/04* (2006.01)
*H04N 1/028* (2006.01)
(Continued)

(52) U.S. Cl.
CPC ........... *H04N 1/0281* (2013.01); *G02B 6/001* (2013.01); *H04N 1/00559* (2013.01)

(58) Field of Classification Search
CPC ... H04N 1/0281; H04N 1/00559; G02B 6/001
(Continued)

(56) References Cited

U.S. PATENT DOCUMENTS

2011/0096526 A1 4/2011 Katabe et al.
2012/0132933 A1 5/2012 Watari et al.
(Continued)

FOREIGN PATENT DOCUMENTS

JP 2012-114284 A 6/2012
JP 2014-63600 A 4/2014
(Continued)

OTHER PUBLICATIONS

International Search Report and Written Opinion dated Oct. 1, 2019 for PCT/JP2019/025087 filed on Jun. 25, 2019, 12 pages including English Translation of the International Search Report.
(Continued)

*Primary Examiner* — Cheukfan Lee
(74) *Attorney, Agent, or Firm* — Xsensus LLP

(57) ABSTRACT

A lighting device includes a rod-shaped light guide, a light guide holder, and an opening optically communicating with the hole. The opening is formed in a first flat surface opposite to a surface into which an end surface of the light guide is inserted. The device also includes a housing, a light source base plate, and a base plate protection layer being formed on a region of the light source base plate other than at least a region on which a light source element is formed. At least one of the light source base plate and the second flat surface of the base plate protection layer is pressed against the housing or the first flat surface at a position at which light emitted by the light source element enters the end surface of the light guide exposed from the opening.

13 Claims, 8 Drawing Sheets

(51) Int. Cl.
*F21V 8/00* (2006.01)
*H04N 1/00* (2006.01)

(58) Field of Classification Search
USPC .................................. 358/475, 484, 482, 483
See application file for complete search history.

(56) References Cited

U.S. PATENT DOCUMENTS

2015/0249104 A1    9/2015   Ota et al.
2015/0381848 A1*  12/2015   Matsui .................. H04N 1/193
                                                                    358/482

FOREIGN PATENT DOCUMENTS

| JP | 2015-154090 A | 8/2015 |
| JP | 2015-159446 A | 9/2015 |
| JP | 2016-181878 A | 10/2016 |
| WO | 2009/082011 A1 | 7/2009 |
| WO | 2014/061274 A1 | 4/2014 |

OTHER PUBLICATIONS

Extended European Search Report dated Jun. 9, 2021 issued in European patent application 19831116.9.

* cited by examiner

LIGHTING DEVICE AND IMAGE READING DEVICE

CROSS-REFERENCE TO RELATED APPLICATIONS

The present application is based on PCT filing PCT/JP2019/025087, filed Jun. 25, 2019, which claims priority to JP 2018-127949, filed Jul. 5, 2018, the entire contents of each are incorporated herein by reference.

TECHNICAL FIELD

The present disclosure relates to (i) a lighting device equipped with a light guide and (ii) an image reading device.

BACKGROUND ART

A light guide is made of a rod-shaped transparent body and is used for a lighting device. A lighting device including the light guide is also called a linear light source device and is used for illumination by an image reading device such as a facsimile, a copier, a scanner, and a bill validator. There is (i) a configuration in which the lighting device is provided inside a housing of the image reading device or (ii) a configuration in which a reading target is arranged between the lighting device and a lens body of the image reading device. Also, the lighting device including the light guide further includes a light source, and light emitted from the light source is incident on an end surface of the light guide and is guided in the light guide. Afterward, linear light is emitted from a light emission surface that is a lateral surface of the light guide. The light source is, for example, an LED.

Conventional lighting devices include a lighting device having a light source base plate on which a light source is provided (i) contacts a light guide holder holding a light guide and (ii) is fixed to a housing (for example, refer to Patent Literature 1). In the lighting device disclosed in Patent Literature 1, the light guide holder has not only a through hole for holding the light guide but also a notch for elastically fixing power supply means by insertion into the notch, the notch being formed on a side wall portion perpendicular to a longitudinal direction. Patent Literature 1 states that this configuration enables (i) suppression of exposure of the power supply means to the outside of the housing and (ii) miniaturization of the lighting device.

Also, the conventional lighting devices include a lighting device in which a light guide holder for holding a light guide is divided into pieces so as to sandwich an optical device between the pieces (for example, refer to Patent Literature 2). The optical device in this patent literature is, for example, a filter. The light guide holder sandwiching the optical device is fixed to a housing.

CITATION LIST

Patent Literature

Patent Literature 1: Unexamined Japanese Patent Application Publication No. 2015-159446
Patent Literature 2: Unexamined Japanese Patent Application Publication No. 2014-63600

SUMMARY OF INVENTION

Technical Problem

In the conventional lighting devices, the light guide holder and the light source base plate are fixed to the housing in direct contact with each other or with the light guide holder and the light source base plate facing each other, and thus the conventional lighting devices have a problem in that, when the light source base plate is changed, a shape of the light guide holder must be also changed. In other words, in designing the light guide holder, not only the shape of the light guide but also a shape of the light source base plate must be considered, and thus the conventional lighting devices have a problem in that design of the light guide holder is complicated.

In order to solve the aforementioned problem, an objective of the present disclosure is to achieve a lighting device and an image reading device for which the light guide holder is easily designed.

Solution to Problem

A lighting device according to the present disclosure includes (i) a rod-shaped light guide extending in a longitudinal direction and having an end surface and an lateral surface, the light guide being configured to guide light entering from the end surface and emit linear light from the lateral surface, (ii) a light guide holder having: a hole into which the end surface of the light guide is inserted; and an opening optically communicating with the hole, the opening being formed in a first flat surface that is flat and opposite to the surface into which the end surface of the light guide is inserted, (iii) a housing to house the light guide and the light guide holder and that support the light guide holder with the end surface of the light guide exposed to an outside, (iv) a light source base plate on which a light source element that emits light toward the end surface of the light guide is formed, and (v) a base plate protection layer having a second flat surface that covers the light source base plate and is flat, the base plate protection layer being formed on a region of the light source base plate other than at least a region on which the light source element is formed. The lighting device is characterized in that at least one of the light source base plate or the second flat surface of the base plate protection layer is pressed against the housing at a position at which the light emitted by the light source element enters the end surface of the light guide exposed from the opening or the at least one of the light source base plate or the second flat surface of the base plate protection layer is pressed against the first flat surface of the light guide holder at the position.

Advantageous Effects of Invention

According to the present disclosure, at the position where the light emitted from the light source element enters the end surface of the light guide exposed from the opening, the light source base plate or the second flat surface of the base plate protection layer is pressed against the housing or the first flat surface of the light guide holder. Thus, the influence of the shape of the light source base plate on the shape of the light guide holder is reduced, thereby simplifying the design of the light guide holder.

DESCRIPTION OF EMBODIMENTS

Embodiment 1

A lighting device and an image reading device 100 according to Embodiment 1 of the present disclosure are described below with reference to FIGS. 1 to 8. The lighting device is a part of the image reading device 100. A longitudinal direction and a transverse direction in the lighting device according to Embodiment 1 respectively correspond to a main scanning direction and a sub-scanning direction of the image reading device 100. Since a reading target 1 that is an object to be illuminated by the lighting device is conveyed relatively in the image reading device 100 in the sub-scanning direction that is the transverse direction, the transverse direction and the sub-scanning direction are also referred to as a conveyance direction. In the following description, the sub-scanning direction and the conveyance direction are referred to as the transverse direction, and the main scanning direction is referred to as the longitudinal direction.

Figure 1:
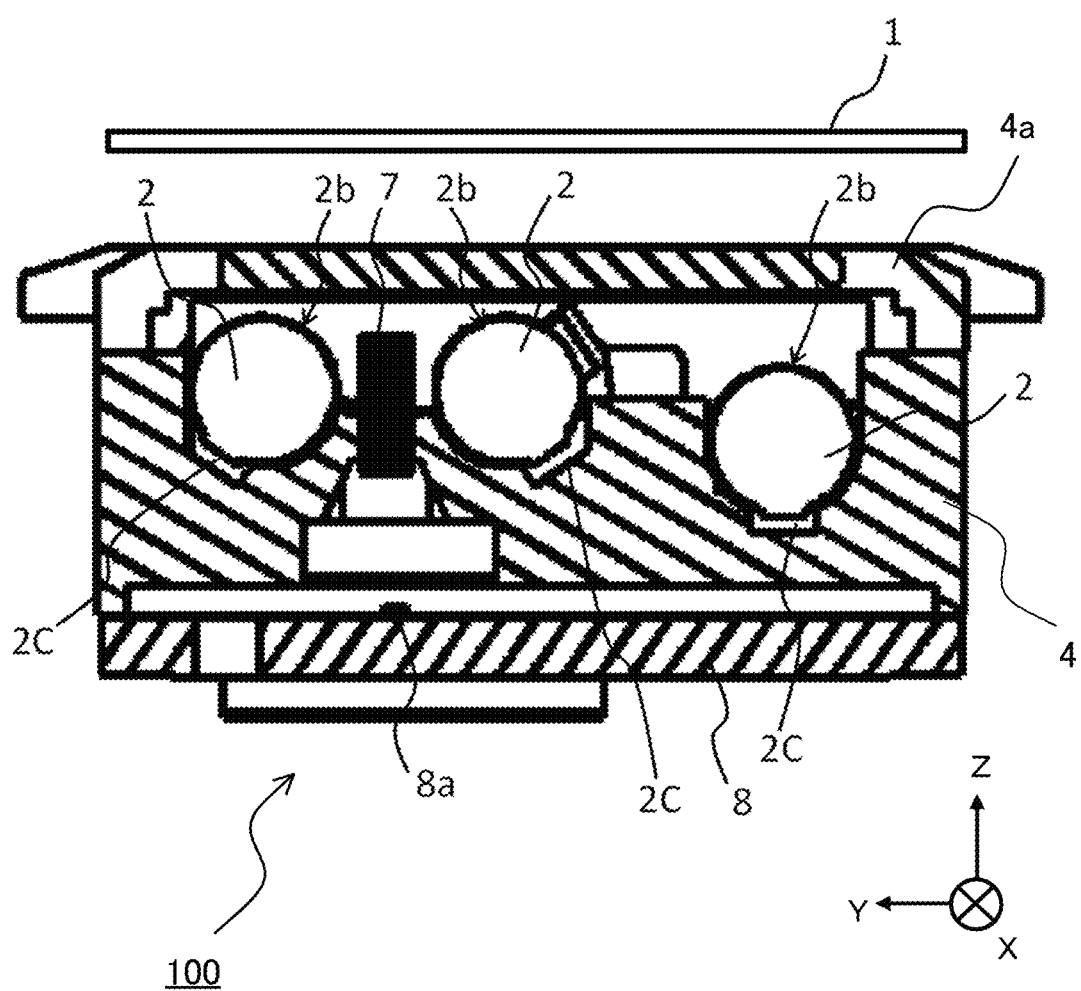
FIG. 1 is a cross-sectional view of an image reading device according to Embodiment 1 of the present disclosure.

In FIGS. 1 to 8, the reading target 1 is a sheet-like object such as a manuscript, printed matter, banknotes, securities, a film and other general documents and has image information. FIG. 1 is a cross-sectional view of the image reading device 100 according to Embodiment 1 in a plane parallel to the transverse direction and a height direction of the image reading device 100.

The lighting device is a part of the image reading device 100 that has a function for emitting light to the reading target 1. The image reading device 100 includes not only the lighting device but also (i) a lens body 7 that focuses light transmitted through or reflected by the reading target 1 and (ii) a sensor base plate 8 on which a sensor element 8a that receives the light focused by the lens body 7 is formed.

The reading target 1 is an object that is to be illuminated by linear light emitted from the lighting device according to Embodiment 1, and the reading target 1 can be said to be a reading target of image information of the image reading device 100 according to Embodiment 1. The longitudinal direction and the transverse direction intersect with each other and are preferably perpendicular to each other. The direction intersecting the longitudinal direction and the transverse direction is defined as the height direction of the lighting device and the image reading device 100. The height direction is preferably perpendicular to the longitudinal direction and the transverse direction. The optical axis direction along the optical axis of the lens body 7 described later corresponds to the height direction. When the optical axis is turned back by a mirror, the optical axis ranging from the reading target 1 to the mirror by which light is first reflected is the height direction. In the drawings, the longitudinal direction is indicated as the X-axis direction, the transverse direction is indicated as the Y-axis direction, and the height direction is indicated as the Z-axis direction.

Figure 2:
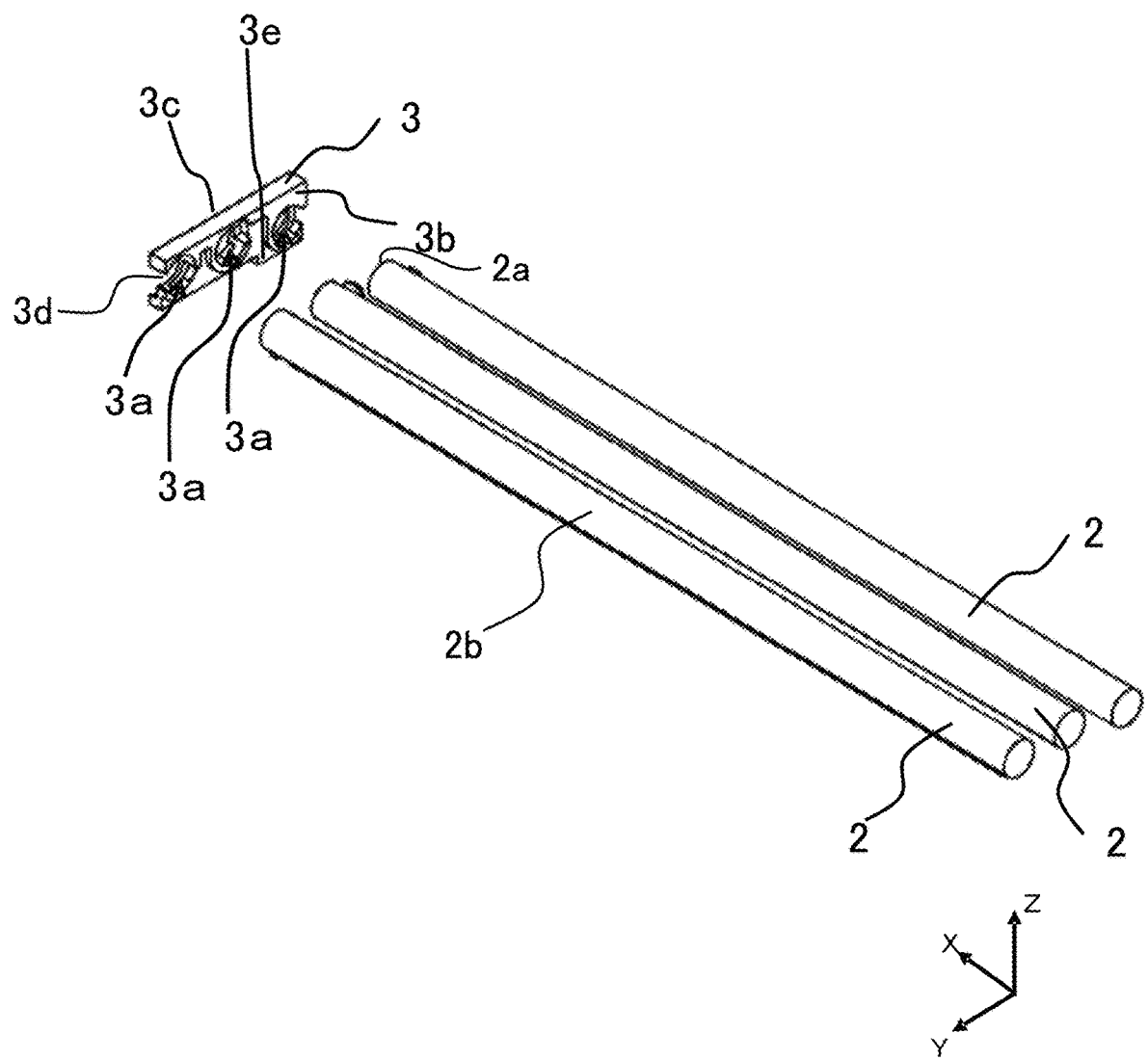
FIG. 2 is a perspective view of a light guide and a light guide holder for a lighting device and the image reading device according to Embodiment 1 of the present disclosure.

FIG. 2 is a perspective view of a light guide 2 and a light guide holder 3 for the lighting device and the image reading device 100 according to Embodiment 1. The light guide 2 is a rod-shaped transparent body and is made of, for example, a resin. As illustrated in FIG. 2, the light guide 2 extends in the longitudinal direction, guides light entering from an end surface 2a, and emits linear light from a lateral surface 2b. As illustrated in FIG. 1, for the light guide 2, a light scattering pattern 2c is formed on a portion opposite to the lateral surface 2b. In addition, although a case where the number of the light guides 2 is three is illustrated in the drawing, the present disclosure is not limited to such a configuration. The number of the light guides 2 may be one or more.

The light guide holder 3 has (i) holes 3a into which the end surfaces 2a of the light guides 2 are inserted and (ii) openings 3d that are formed in a flat first flat surface 3c opposite to an insertion surface 3b into which the end surfaces 2a of the light guides 2 are inserted, the openings 3d optically communicating with the holes 3a. The number of the formed holes 3a and openings 3d is freely selected as long as the number matches the number of the light guides 2.

As illustrated in FIG. 2, for the purpose of reducing the size of the light guide holder 3, portions of the holes 3a and the openings 3d may be cut out. The partially cut-out shape is, for example, a Landolt ring or a C-shaped ring. FIG. 2 illustrates a state before the light guides 2 are inserted into the light guide holder 3 in which portions of the holes 3a and the openings 3d are cut out.

Although a housing 4 is covered with a transparent top plate 4a as illustrated in FIG. 1, the top plate 4a is omitted in FIGS. 2 to 8. The top plate 4a may be actually omitted or a product into which the lighting device is incorporated may include the top plate 4a for the housing 4. The housing 4 houses the light guides 2 and the light guide holder 3 and supports the light guide holder 3 with the end surfaces 2a of the light guides 2 exposed to the outside.

Figure 3:
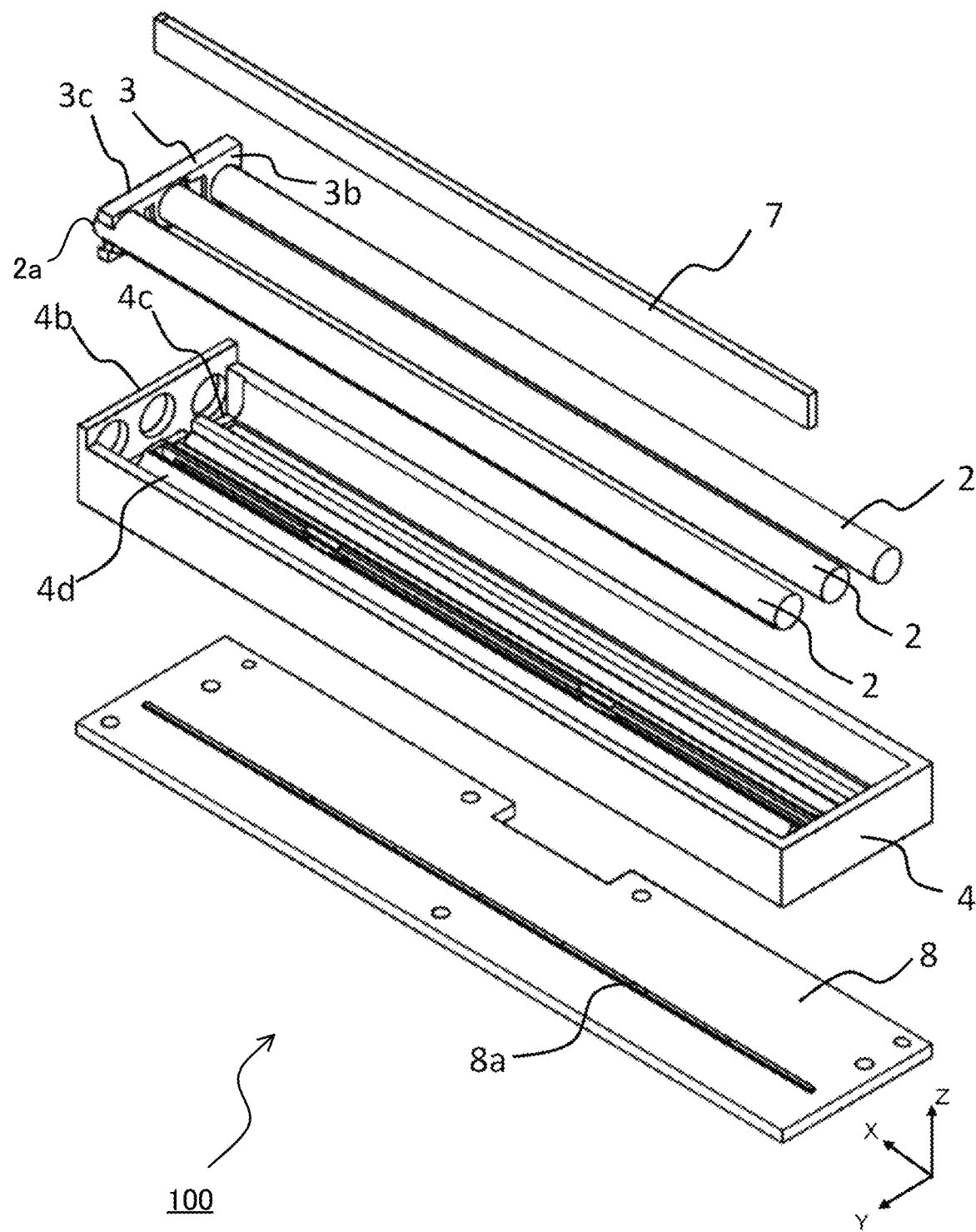
FIG. 3 is an exploded perspective view of the image reading device.

FIG. 3 is an exploded perspective view of the image reading device 100 and illustrates a state before an assembly of the light guides 2 inserted into the light guide holder 3 is attached to the housing 4. The housing 4 has a side wall 4b. The side wall 4b is disposed between a light source base plate 5 and the light guide holder 3 in a region, other than at least a portion at which the end surfaces 2a of the light guides 2 are exposed to the outside, in a cross section intersecting with the longitudinal direction. FIG. 3 illustrates a state in which there is no light source base plate 5, and FIG. 3 illustrates a state before the lens body 7 and the sensor base plate 8 that are described later are attached to the housing 4.

Figure 4:
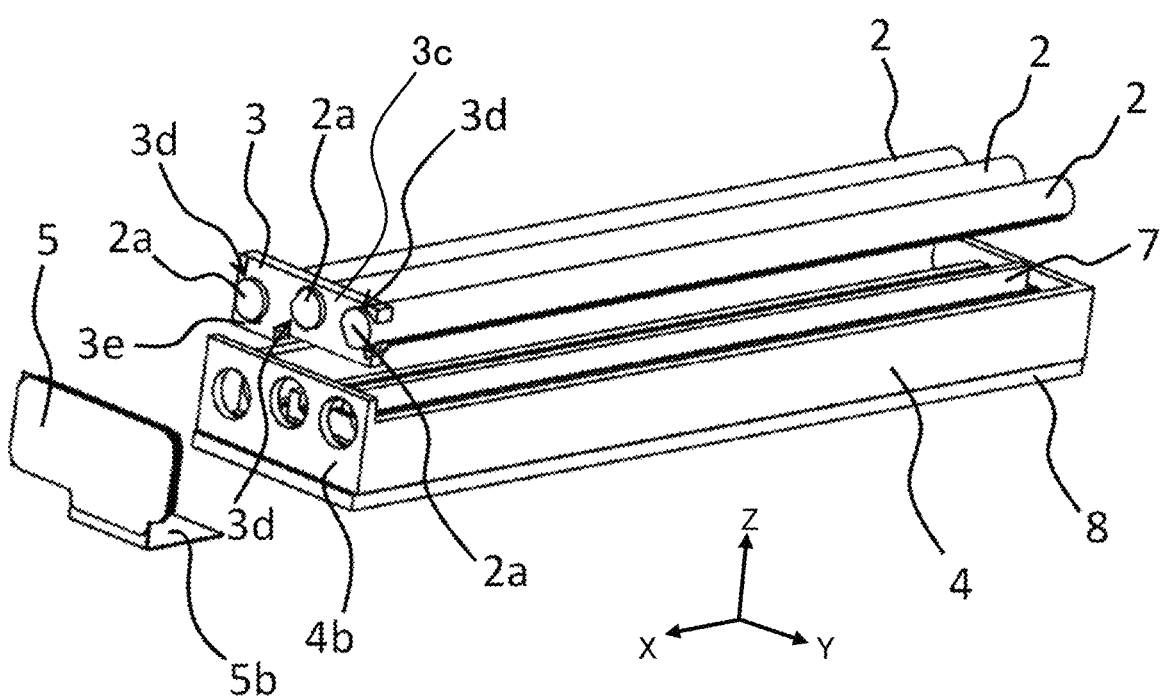
FIG. 4 is an exploded perspective view of the image reading device.

FIG. 4 is an exploded perspective view of the image reading device 100 and illustrates a state before the assembly of the light guide holder 3 into which the light guides 2 are inserted and the light source base plate 5 is attached to the housing 4. In Embodiment 1, three holes corresponding to the end surfaces 2a of the light guides 2 are formed on the side wall 4b. When the openings of the holes are widened by widening diameters or by causing communication between these holes, the side wall 4b can be said to be disposed between the light source base plate 5 and the light guide holder 3 on the region other than at least the portion at which the first flat surface 3c is exposed to the outside in the cross section intersecting the longitudinal direction. That is, the housing 4 may support the light guide holder 3 with the first flat surface 3c also exposed to the outside.

Figure 5:
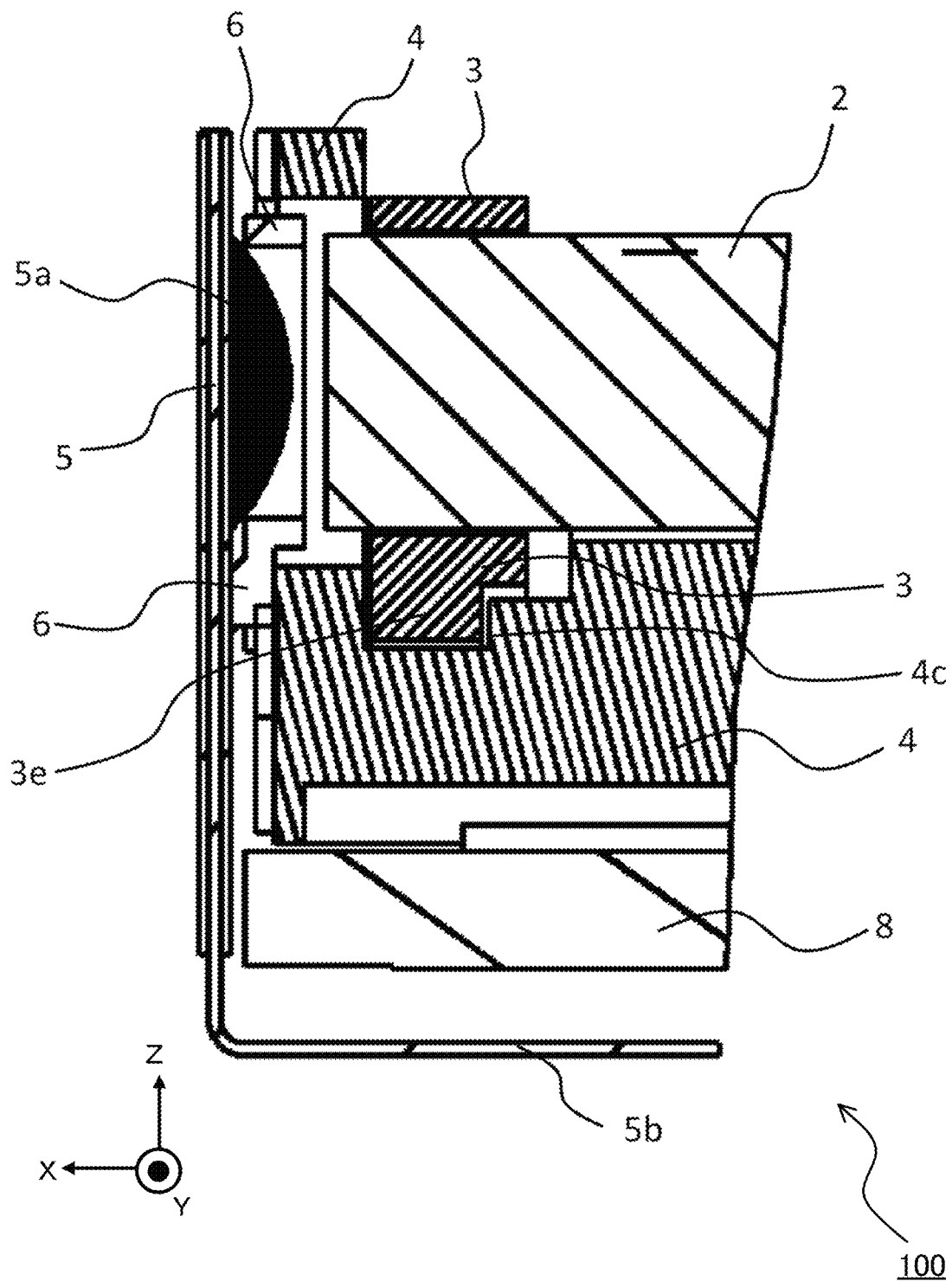
FIG. 5 is a cross-sectional view of the image reading device.

FIG. 5 is an enlarged view of end portion in a cross-sectional view taken on a plane parallel to the longitudinal direction and the height direction of the image reading device 100. As illustrated in FIGS. 3 and 5, the housing 4 has a recess 4c corresponding to the outer shape of the light guide holder 3, and the light guide holder 3 is fixed to the recess 4c. The light guide holder 3 includes a projection 3e that is fitted to the recess 4c. That is, the recess 4c is adapted to the shape of the projection 3e. The projection 3e protrudes in the height direction. Accordingly, the recess 4c can be said to be depressed in the height direction.

The first flat surface 3c of the light guide holder 3 and the side wall 4b of the housing 4 are formed in virtual planes parallel to the transverse direction and the height direction and are offset relative to each other in the longitudinal direction. In the present embodiment, a case in which the light guide holder 3 is provided only at one end surface 2a of the light guide 2 is described as an example. However, another light guide holder 3 may also be provided on the other end surface of the light guide 2. That is, (i) the first flat surface 3c of the light guide holder 3 and the side wall 4b of the housing 4 and (ii) a second flat surface 6a of a base plate protection layer 6 and the light source base plate 5 that are described later may be provided at both the end surfaces of the light guide 2.

The light source base plate 5 includes a light source element 5a for emitting light toward the end surface 2a of the light guide 2. The light source base plate 5 is provided outside the housing 4. The light source element 5a is molded with resin. A component including the resin-molded portion may be referred to as the light source element 5a. Although FIG. 5 illustrates a case in which the light source element 5a is resin-molded, the present disclosure is not limited to such a configuration. That is, the light source element 5a may be non-resin-molded.

The light source base plate 5 is provided with a cable 5b for supplying power to the light source element 5a or transmitting a control signal. The cable 5b is preferably a flexible base plate. The base plate protection layer 6 has a second flat surface 6a that covers the light source base plate 5 and is a flat surface, and is formed on the housing 4-side surface of the light source base plate 5 except at least at the light source element 5a. A periphery portion of the base plate protection layer 6 that surrounds the light source element 5a has a cylindrical shape and projects toward the end surface 2 a of the light guide 2. When the light source element 5a is resin-molded, the portion referred to as the light source element 5a also includes a resin-molded portion.

This cylindrical projection of the base plate protection layer 6 protects the light source element 5a from collision of the light source element 5a with other members. Accordingly, the height of the projection that is a protrusion in the main scanning direction is preferably higher than the height of the light source element 5a. Like the first flat surface 3c of the light guide holder 3 and the side wall 4b of the housing 4, the second flat surface 6a of the base plate protection layer 6 and the light source base plate 5 (i) are provided in a virtual plane parallel to the transverse direction and the height direction and (ii) are offset from each other in the longitudinal direction.

The lighting device according to Embodiment 1 includes the light guide 2, the light guide holder 3, the housing 4, the light source base plate 5, and the base plate protection layer 6. The image reading device 100 according to Embodiment 1 includes the lens body 7 and the sensor base plate 8 in addition to the light guide 2, the light guide holder 3, the housing 4, the light source base plate 5, and the base plate protection layer 6. Accordingly, in FIG. 1, the components other than the lens body 7 and the sensor base plate 8 can be said to be the lighting device according to Embodiment 1. A drawing illustrating only the lighting device is omitted.

As illustrated in FIG. 1, the light scattering pattern 2c formed on the light guide 2 extends in the longitudinal direction and has an uneven shape formed on the surface of the light guide 2. For example, the light scattering pattern 2c has a fine uneven surface or an embossed surface. Also, the light scattering pattern 2c formed on the light guide 2 may be a white paint formed on the surface of the light guide 2 in the longitudinal direction. For example, the light scattering pattern 2c is formed by silk screen printing. Such light scattering patterns 2c reflect and scatter light propagating inside the light guide 2. Accordingly, the linear light can be emitted from the lateral surface 2b of the light guide 2 toward the reading target 1 to be illuminated. The light guide 2 changes the propagation direction of the light by reflecting or refracting the light entering from the end surface 2a to guide the light. That is, the light propagates inside the light guide 2 in the longitudinal direction.

Such a light source element 5a that allows light to enter the light guide 2 and is formed on the light source base plate 5 is a freely-selected optical element, for example, a light emitting diode (LED) or an organic electro luminescence (EL). The light source base plate 5 and the light source element 5a may be collectively referred to as a light source. The light emitted by the light source element 5a surrounded by the base plate protection layer 6 enters the light guides 2 from the end surfaces 2a through the openings 3d and the holes 3a of the light guide holder 3.

The opening 3d and the holes 3a of the light guide holder 3 and at least the periphery portion of the base plate protection layer 6 surrounding the light source element 5a preferably have a color such as white having a high reflectance. By using such a color, light emitted from the light source element 5a can be efficiently transmitted to the end surfaces 2a, and light leaking from the end surfaces 2a can be also returned to the light guides 2 again. At least a light source element 5a-side surface of the "cylindrical projection" of the base plate protection layer 6 projecting cylindrically toward the end surface 2a of the light guide 2 is preferably white. The light source element 5a preferably emits light having a light emission color in accordance with the image information on the reading target 1 to be illuminated. For example, the light source element 5a emits light such as red light (R), green light (G), blue light (B), white light (H), ultraviolet light (UV), and infrared light (IR).

Multiple light source elements 5a corresponding to multiple light guides 2 may be formed on the light source base plate 5 to emit multiple light beams with different wavelengths simultaneously or at different times. One light source element 5a may include multiple elements. In FIG. 1, a straight line connecting the lateral surface 2b and the light scattering pattern 2c of each of the light guides 2 is the optical axis of the linear light emitted from the linear light source. In the present embodiment, an example is illustrated in which one of the three light guides 2 is used as a transmission light source and the other two guides are used as reflection light sources. The optical axis of one light guide 2 that is the transmission light source is orthogonal to the transverse direction that is the conveyance direction of the reading target 1. Also, the optical axes of the other two light guides 2 that are the reflection light sources are inclined with respect to the transverse direction.

As illustrated in FIGS. 1 and 5, the image reading device 100 according to Embodiment 1 includes the lens body 7 and the sensor base plate 8 in addition to the light guide 2, the light guide holder 3, the housing 4, the light source base plate 5, and the base plate protection layer 6. The lens body 7 illustrated in FIG. 1 focuses light generated by reflecting, by the reading target 1, the linear light emitted from the lateral surface 2b of the light guide 2 that is the reflection light source. The sensor element 8a of the sensor base plate 8 receives the light focused by the lens body 7. In this case, the housing 4 holds the lens body 7 and the sensor base plate 8. Additionally, a non-illustrated lens body and a non-illustrated sensor base plate are also provided on the side of the reading target 1 opposite to the light guide 2. Linear light emitted from the lateral surface 2b of the light guide 2 that is the transmission light source passes through the reading target 1, is focused by the lens body, and is received by the sensor element of the sensor base plate.

In Embodiment 1, the image reading device 100 includes the lens body 7 that is an erecting non-magnifying rod lens array. The rod lens array includes a large number of rod lenses arranged in an array along the longitudinal direction. However, the lens body 7 of the present disclosure is not limited to such a lens array, and the lens body 7 may be an erecting equal-magnification microlens array or a lens of a reduction optical system. The lens body 7 is inserted into and fixed to a groove-shaped lens body holding portion 4d formed in the longitudinal direction of the housing 4 illustrated in FIG. 3.

In the image reading device 100 according to Embodiment 1, a large number of sensor elements 8a are arranged on the sensor base plate 8 in an array in the longitudinal direction. However, the present disclosure is not limited to such a configuration. In addition to the sensor element 8a, various types of electronic components are mounted on the sensor base plate 8. For example, an external connector and a signal processing IC (application specific integrated circuit (ASIC)) are mounted on the sensor base plate 8. The signal processing IC may be provided on a base plate different from the sensor base plate 8.

The signal processing IC cooperates with a central processing unit (CPU) and a random access memory (RAM) to perform signal processing of outputs that are received and photoelectrically converted by the sensor elements 8a. The CPU, the RAM, and the signal processing IC are collectively referred to as a signal processor. The sensor elements 8a whose light receiving portions are located on the optical axis of the lens body 7 are mounted on the sensor base plate 8. The external connector provided on the sensor base plate 8 is used as an input/output signal interface including photoelectric conversion outputs, and signal processing outputs thereof, of the sensor elements 8a.

At least one of the light source base plate 5 or the second flat surface 6a of the base plate protection layer 6 is pressed against the housing 4 at a position at which the light emitted from the light source element 5a enters the opening 3d. After the light guide holder 3 is attached to the housing 4 by fitting the projection 3e of the light guide holder 3 into the recess 4c of the housing 4, at least one of the light source base plate 5 or the second flat surface 6a is pressed against the housing 4. FIG. 5 illustrates a state in which the light source base plate 5 or the second flat surface 6a is pressed against and fixed to the housing 4 by a bonding member 9.

Here, at a position at which the light emitted from the light source element 5a enters the opening 3d, at least one of the light source base plate 5 or the second flat surface 6a of the base plate protection layer 6 may be pressed against the first flat surface 3c of the light guide holder 3. Such a configuration is preferable for a case in which the diameter of the three holes formed in the side wall 4b is increased or the three holes are made to communicate with each other, thereby widening the openings of the holes. As described above, the lighting device and the image reading device 100 according to Embodiment 1 have a configuration in which at least one of the light source base plate 5 or the second flat surface 6a is pressed against the housing 4 or the first flat surface 3c. Accordingly, even when the shape of the light source base plate 5 is changed, there is no need to greatly change the shape of the light guide holder 3. That is, when designing the light guide holder 3, the necessity of considering the shape of the light source base plate 5 in addition to the shape of the light guide 2 becomes low.

Figure 6:
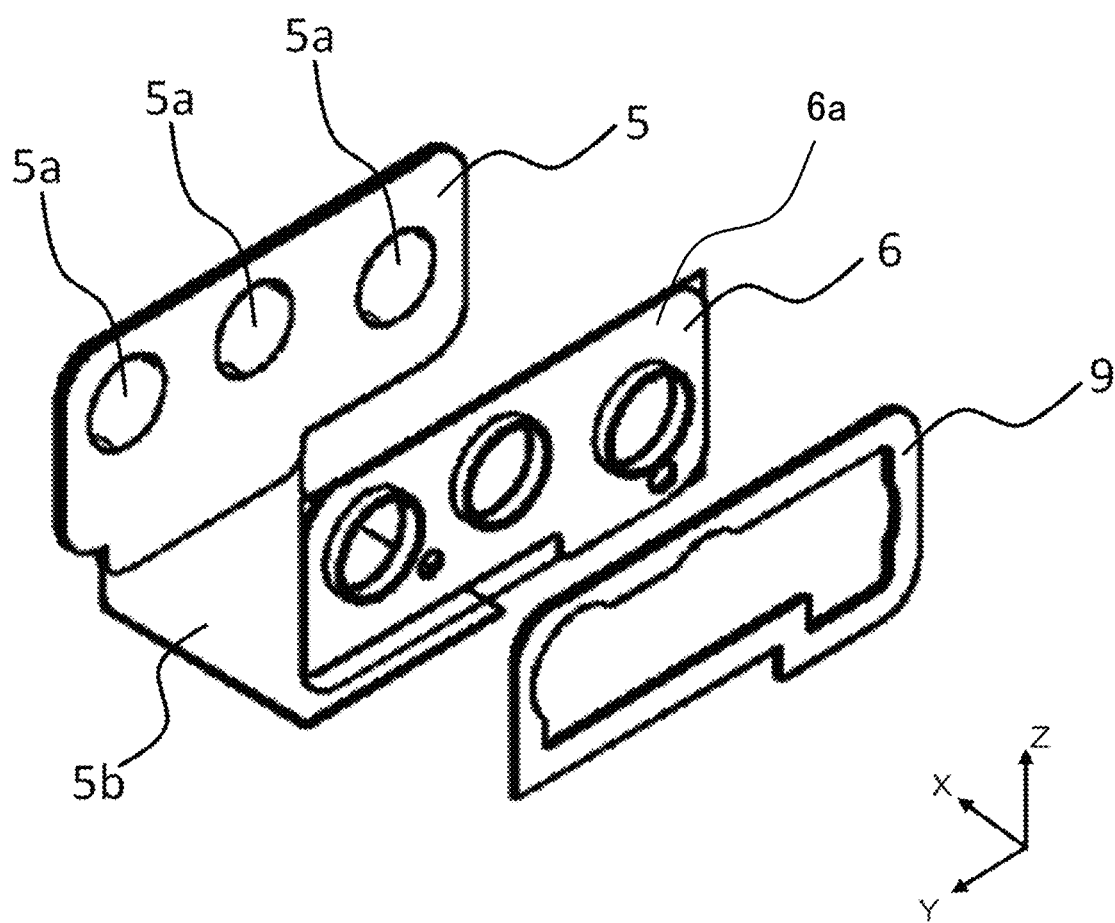
FIG. 6 is an exploded perspective view of a light source base plate, a base plate protection layer, and a bonding member for the lighting device and the image reading device.
Figure 7:
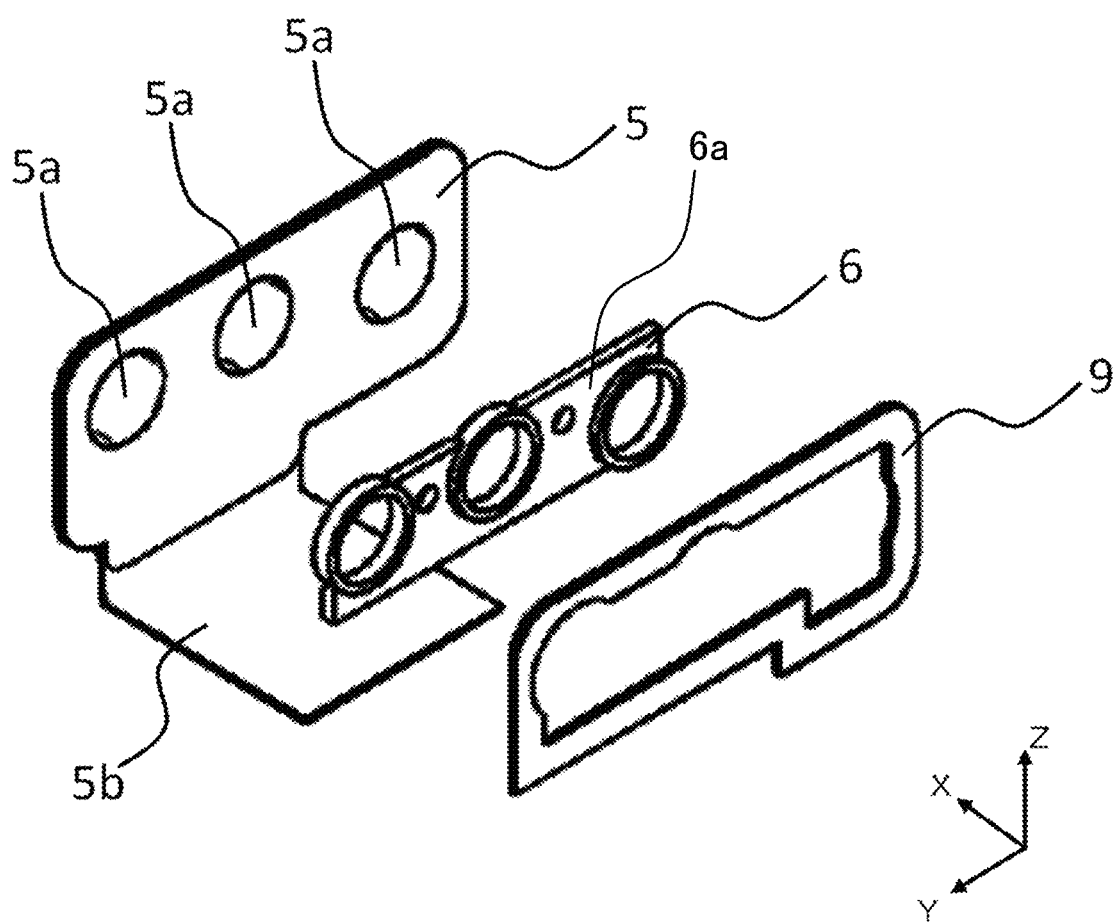
FIG. 7 is an exploded perspective view of the light source base plate, the base plate protection layer, and the bonding member for the lighting device and the image reading device.
Figure 8A:
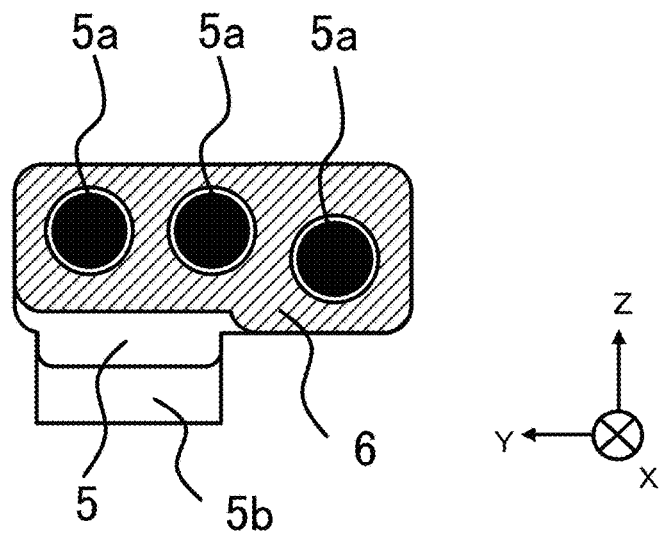
FIG. 8A is a front view of the light source base plate and the base plate protection layer for the lighting device and the image reading device.
Figure 8B:
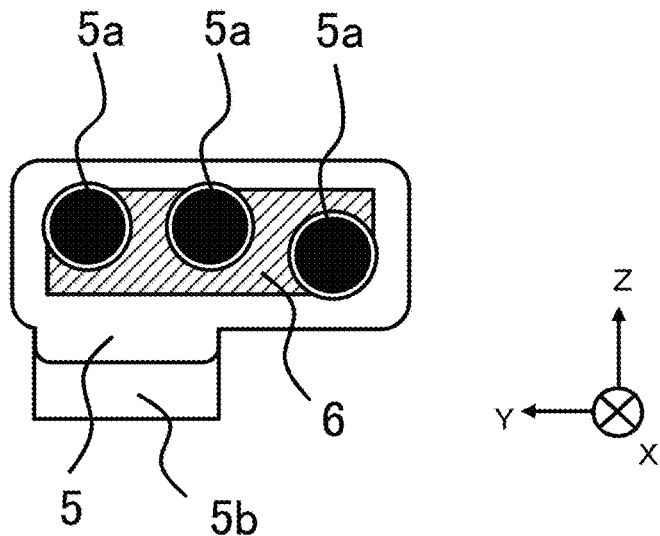
FIG. 8B is a front view of the light source base plate and the base plate protection layer for the lighting device and the image reading device.
Figure 8C:
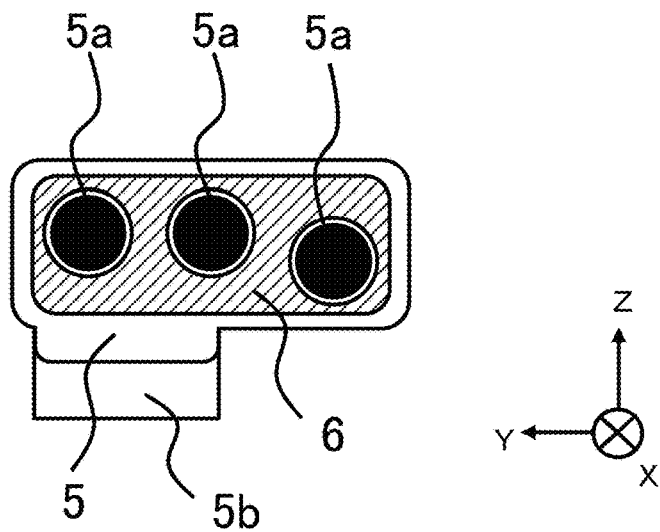
FIG. 8C is a front view of the light source base plate and the base plate protection layer for the lighting device and the image reading device.

FIGS. 6 and 7 are perspective views of a state before assembling the light source base plate 5, the base plate protection layer 6, and the bonding member 9. FIGS. 8A, 8B and 8C are front views of the light source base plate 5 and the base plate protection layer 6. The base plate protection layer 6 is fixed to the light source base plate 5 by freely-selected bonding means. For example, the base plate protection layer 6 is fixed to the base plate 5 using resin. Alternatively, the base plate protection layer 6 may be laminated onto the light source base plate 5. Here, FIGS. 6 and 7 are schematic illustrations. At least one of the light source base plate 5 or the second flat surface 6a of the base plate protection layer 6 is pressed against the housing 4 or the first flat surface 3c of the light guide holder 3 with the bonding member 9 therebetween.

FIGS. 6 and 8A illustrate a case in which the outer periphery of the base plate protection layer 6 matches the outer periphery of the light source base plate 5 at a region other than the cable 5b. FIGS. 7 and 8B illustrates a case in which the outer periphery of the base plate protection layer 6 is located inside the outer periphery of the light source base plate 5 also at the region other than that of the cable 5b and in the vicinity of the light source element 5a. In particular, in the case of FIGS. 7 and 8B, the base plate protection layer 6 has the "cylindrical projection" that cylindrically projects toward the end surface 2a of the light guide 2, and the second flat surface 6a is formed only in the vicinity of the periphery of the "cylindrical projection".

As illustrated in FIG. 8C, dimensions intermediate between dimensions illustrated in FIGS. 6 and 8A and dimensions illustrated in FIGS. 7 and 8B may be used. The base plate protection layer 6 illustrated in FIGS. 7, 8B and 8C is formed on a region other than a region along the outer periphery of the light source base plate 5. In any case, the outer periphery of the light source base plate 5 and the outer periphery of the first flat surface 3c of the light guide holder 3 are fixed by the bonding member 9.

As illustrated in FIGS. 6 and 7, the bonding member 9 has a ring shape. Specifically, the bonding member 9 has a rectangular ring shape. The ring shape is annular, and examples of the ring shape include an elliptical or rectangular ring shape.

The bonding member 9 may partially bond the outer periphery of the light source base plate 5 or the second flat surface 6a of the base plate protection layer 6 to the outer periphery of the side wall 4b of the housing 4 or the first flat surface 3c of the light guide holder 3. The bonding member 9 that partially bonds the outer periphery of the light source base plate 5 or the second flat surface 6a to the outer periphery of the side wall 4b or the first flat surface 3c may have an incomplete ring shape. Such an incomplete ring shape is, for example, a Landolt ring-like ring shape or a C-shaped ring shape. Also, the bonding member 9 partially bonding these portions may has a ring shape. In addition, the bonding member 9 is preferably a sheet-like member that avoids at least a "cylindrical projection" that cylindrically projects toward the end surface 2a of the light guide 2.

The lighting device according to Embodiment 1 can be used as a reflection light source or a transmission light source of the image reading device 100 as illustrated in FIG. 1. That is, the lens body 7 of the image reading device 100 according to Embodiment 1 focuses reading target-mediated light among the linear light emitted from the lateral surface 2b of the light guide 2. The "reading target-mediated light" means light reflected by the reading target or light passing through the reading target.

When the lighting device according to Embodiment 1 is used as a transmission light source, the lens body 7 and the sensor base plate 8 are provided outside the housing 4 of the image reading device 100. That is, the lens body 7 and the sensor base plate 8 are arranged on a side of the reading target 1 opposite to the light guide 2.

When the lighting device according to Embodiment 1 is used as a reflection light source, the lens body 7 and the sensor base plate 8 are arranged on the same side of the reading target 1 as the light guide 2. Even when the lighting device is used as a reflection light source, the lens body 7 and the sensor base plate 8 may be provided outside the housing 4 of the image reading device 100. Also, in the image reading device 100 using the lighting device according to Embodiment 1 as a reflection light source, another lighting device including another light guide 2 that is provided on the optical axis of the lens body 7 and on a side of the reading target 1 opposite to the lens body 7 may be arranged as a transmission light source.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-127949, filed on Jul. 5, 2018, the entire disclosure of which is incorporated by reference herein.

REFERENCE SIGNS LIST

1 Reading target
2 Light guide
2a End surface
2b Lateral surface
2c Light scattering pattern
3 Light guide holder
3a Hole
3b Surface (insertion surface)
3c First flat surface
3d Opening
3e Projection
4 Housing
4a Top plate
4b Side wall
4c Recess
4d Lens body holding portion
5 Light source base plate
5a Light source element
5b Cable
6 Base plate protection layer
6a Second flat surface
7 Lens body (rod lens array)
8 Sensor base plate
8a Sensor element (sensor element array)
9 Bonding member
100 Image reading device

The invention claimed is:

1. A lighting device comprising:
a rod-shaped light guide extending in a longitudinal direction and having an end surface and a lateral surface, the light guide being configured to guide light entering from the end surface and emit linear light from the lateral surface;
a light guide holder having
a hole to receive the end surface of the light guide, and
an opening optically communicating with the hole, the opening being formed in a first flat surface that is flat and opposite to a surface having the hole that receives the end surface of the light guide;
a housing to house the light guide and the light guide holder and support the light guide holder with the end surface of the light guide exposed to an outside;
a light source base plate on which a light source element that emits light toward the end surface of the light guide is formed; and
a base plate protection layer having a second flat surface that covers the light source base plate and is flat, the base plate protection layer being formed on a region of the light source base plate other than at least a region on which the light source element is formed, wherein
at least one of the light source base plate or the second flat surface of the base plate protection layer is pressed against the housing with a bonding member therebetween or the at least one of the light source base plate or the second flat surface of the base plate protection layer is pressed against the first flat surface of the light guide holder with the bonding member therebetween, at a position, in a direction along the longitudinal direction, at which the light emitted by the light source element enters the opening,
the housing includes a side wall, and
in a cross section perpendicular to the longitudinal direction, the side wall is arranged between the light source base plate and the light guide holder in a region other than at least a portion at which the end surface of the light guide is exposed to the outside.

2. The lighting device according to claim 1, wherein the bonding member has a ring shape.

3. The lighting device according to claim 2, wherein
the side wall of the housing exposes the end surface of the light guide and a portion of the first flat surface to the outside, and
in the cross section perpendicular to the longitudinal direction, the side wall is arranged between the light source base plate and the light guide holder in a region other than at least a portion at which the end surface of the light guide and the portion of the first flat surface are exposed to the outside.

4. The lighting device according to claim 1, wherein the bonding member partially bonds an outer periphery of the light source base plate to an outer periphery of the first flat surface.

5. The lighting device according to claim 4, wherein
the side wall of the housing exposes the end surface of the light guide and a portion of the first flat surface to the outside, and
in the cross section perpendicular to the longitudinal direction, the side wall is arranged between the light source base plate and the light guide holder in a region other than at least a portion at which the end surface of the light guide and the portion of the first flat surface are exposed to the outside.

6. The lighting device according to claim 1, wherein
the side wall of the housing exposes the end surface of the light guide and a portion of the first flat surface to the outside, and
in the cross section perpendicular to the longitudinal direction, the side wall is arranged between the light source base plate and the light guide holder in a region other than at least a portion at which the end surface of the light guide and the portion of the first flat surface are exposed to the outside.

7. The lighting device according to claim 1, wherein
the housing has a recess adapted to a contour of the light guide holder, and
the light guide holder is fixed to the recess.

8. The lighting device according to claim 1, wherein the light source base plate is arranged outside the housing.

9. The lighting device according to claim 1, wherein the base plate protection layer has a cylindrical projection in the vicinity of the light source element, the cylindrical projection protruding toward the end surface of the light guide.

10. An image reading device comprising:
the lighting device according to claim 1;
a lens body to focus light mediated by a reading target, the light being among linear light emitted from the lateral surface of the light guide; and
a sensor base plate including a sensor element to receive the light focused by the lens body.

11. The image reading device according to claim 10, wherein the housing supports the lens body and the sensor base plate.

12. The image reading device according to claim 10, wherein the lens body and the sensor base plate are arranged on a side of the reading target opposite to the light guide.

13. A lighting device comprising:
a rod-shaped light guide extending in a longitudinal direction and having an end surface and a lateral surface, the light guide being configured to guide light entering from the end surface and emit linear light from the lateral surface;
a light guide holder having
a hole to receive the end surface of the light guide, and
an opening optically communicating with the hole, the opening being formed in a first flat surface that is flat and opposite to a surface having the hole that receives the end surface of the light guide;
a housing to house the light guide and the light guide holder and support the light guide holder with the end surface of the light guide exposed to an outside;
a light source base plate on which a light source element that emits light toward the end surface of the light guide is formed; and
a base plate protection layer having a second flat surface that covers the light source base plate and is flat, the base plate protection layer being formed on a region of the light source base plate other than at least a region on which the light source element is formed, wherein
at least one of the light source base plate or the second flat surface of the base plate protection layer is pressed against the housing with a bonding member therebetween or the at least one of the light source base plate or the second flat surface of the base plate protection layer is pressed against the first flat surface of the light guide holder with the bonding member therebetween, at a position, in a direction along the longitudinal direction, at which the light emitted by the light source element enters the opening, and
the base plate protection layer has a cylindrical projection in the vicinity of the light source element, the cylindrical projection protruding toward the end surface of the light guide.

* * * * *